(No Model.)

T. EYNON.
CUTTING TOOL FOR MILLING AND GEAR CUTTING MACHINES.

No. 392,597. Patented Nov. 13, 1888.

Witnesses.
Chas. R. Burr.
E. F. Murdock.

Inventor.
Thomas Eynon,
by Franck D. Johns,
his Attorney.

UNITED STATES PATENT OFFICE.

THOMAS EYNON, OF CLEVELAND, OHIO, ASSIGNOR TO EYNON & INGERSOLL, OF SAME PLACE.

CUTTING-TOOL FOR MILLING AND GEAR-CUTTING MACHINES.

SPECIFICATION forming part of Letters Patent No. 392,597, dated November 13, 1888.

Application filed July 17, 1888. Serial No. 280,184. (No model.)

*To all whom it may concern:*

Be it known that I, THOMAS EYNON, a citizen of the United States, residing at Cleveland, in the county of Cuyahoga and State of Ohio, have invented certain new and useful Improvements in Cutting-Tools for Milling-Machines and Gear-Cutting Machines; and I do hereby declare the following to be a full, clear, and exact description of the invention, such as will enable others skilled in the art to which it appertains to make and use the same.

My invention relates to improvements in cutting-tools for milling-machines, and more particularly to that class of devices for cutting the teeth of gear-wheels which have a series of removable cutters arranged on a circular holder adapted to be secured to a suitable shaft or mandrel; and it consists in certain novelty in the construction and arrangement of the various parts, all of which I will now proceed to point out and describe, reference being had to the accompanying drawings, in which—

Figure 1:
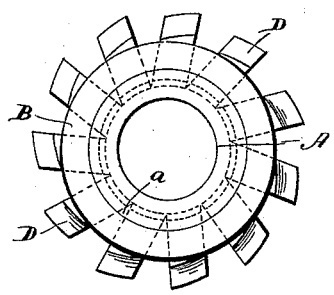
Figure 2:
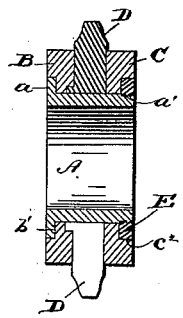
Figure 3:
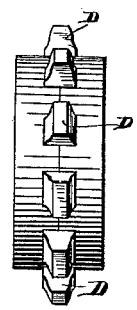
Figure 4:
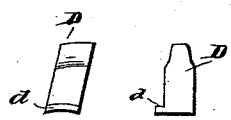
Figure 5:
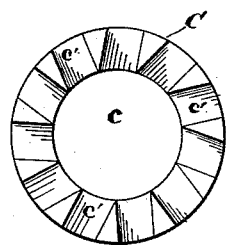
Figure 6:
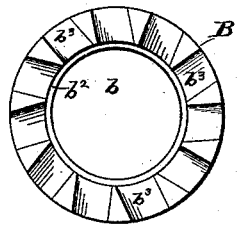

Figure 1 is a side elevation of my improved cutter; Fig. 2, a transverse section taken through the center of the same; Fig. 3, an edge or face view; Fig. 4, a detail showing one of the cutters removed; and Figs. 5 and 6 are details.

Referring to said drawings, A represents a cylindrical bushing or hub, having on one end an annular flange, $a$, and on its other end a screw-thread, $a'$.

B and C are circular retaining-plates or housings of the same diameter, which hold the cutters in place, as hereinafter described. The plate B has a central circular opening, $b$, concentric with its circumference and of sufficient diameter to permit the plate to fit snugly on the bushing.

$b'$ is an annular recess on the inner face of said plate around the central opening, $b$, and corresponding to the shape of the annular flange $a$. When the plate is placed on the bushing, the flange $a$ enters the recess $b'$ and holds said plate in place, the outer end of the bushing coming flush with the outer face of the plate. On the inner face of the plate around the central opening is an annular recess, $b^2$.

$b^3$ are a series of approximately radial recesses formed on the inner face of said plate.

$c$ is a central circular opening in the plate C concentric with its circumference and of sufficient diameter to permit said plate C to fit snugly on the bushing.

$c'$ are a series of approximately radial recesses formed on the inner face of said plate C and corresponding to the shape of the recesses $b^3$. When the plates B and C are placed on the bushing, the recesses $b^3$ and $c'$ register with each other and form sockets in the periphery of the holder, in which the cutters are held.

$c^2$ is an annular recess on the outer face of the plate C around the central opening.

D are a series of removable cutters, the cutting faces of which correspond to the shape of the tooth desired to be cut in the blank, or of any other desired shape. The inner end of the shanks of the cutters are formed on the arc of a circle concentric with the circumference of the bushing A and rest against said bushing. On one side of the inner ends of said cutters are formed lugs or projections $d$, which engage with the annular recess $b^2$ in the plate B.

E is a nut, which is screwed onto the threaded end of the bushing and clamps the side plates between the flange $a$ and said nut, and holds said plates and the cutters securely in position. Said nut E enters the recess $c^2$.

To assemble the parts of my gear-cutter, the plate B is first placed on the bushing, the flange $a$ engaging with the recess $b'$. The cutters are then placed in the recesses $b^3$, their inner ends resting on the bushing and the flanges $d$ engaging with the annular recess $b^2$. The plate C is then placed on the bushing, so that the recesses $c'$ will fit over the cutters. Then the nut E is screwed on the threaded end of the bushing, thus clamping the plates between the flange $a$ and said nut and the cutters between said plates. The cutter is then ready for use, and may be secured on the shaft or mandrel of a gear-cutting machine in any suitable manner.

Having thus fully described my invention, I claim as new and desire to secure by Letters Patent—

A cutting-tool for milling-machines, consisting of the bushing or hub A, having the annular flange $a$ on one end and screw-thread on its opposite end, in combination with the plate B, having the central circular opening, $b$, and mounted on the bushing, the annular recess $b'$ on its outer face, the annular recess $b^2$ on its inner face, and radial recesses $b^3$, the plate C, having the central circular opening, $c$, and mounted on the bushing, the radial recesses $c'$, the series of cutters D, held between the plates B and C in the recesses $b^3$ $c'$, and having the lugs or projections $d$, engaging with the recess $b$, and the nut E, screwed onto the bushing and clamping said parts together, all constructed and arranged substantially as shown and described.

In testimony whereof I affix my signature in presence of two witnesses.

THOMAS EYNON.

Witnesses:
J. E. INGERSOLL,
A. F. INGERSOLL.